United States Patent
Yang et al.

(10) Patent No.: US 10,075,226 B2
(45) Date of Patent: Sep. 11, 2018

(54) PER STREAM AND PER ANTENNA CYCLIC SHIFT DELAY IN UPLINK MULTI-USER MIMO

(71) Applicant: QUALCOMM Incorporated, San Diego, CA (US)

(72) Inventors: Lin Yang, San Diego, CA (US); Bin Tian, San Diego, CA (US); Jialing Li Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 216 days.

(21) Appl. No.: 14/871,925

(22) Filed: Sep. 30, 2015

(65) Prior Publication Data

US 2016/0099764 A1   Apr. 7, 2016

Related U.S. Application Data

(60) Provisional application No. 62/059,808, filed on Oct. 3, 2014.

(51) Int. Cl.
*H04B 7/06* (2006.01)
*H04L 5/00* (2006.01)

(52) U.S. Cl.
CPC ......... *H04B 7/0697* (2013.01); *H04B 7/0671* (2013.01); *H04L 5/0023* (2013.01)

(58) Field of Classification Search
CPC .... H04B 7/0697; H04B 7/0671; H04L 5/0023
See application file for complete search history.

(56) References Cited

U.S. PATENT DOCUMENTS

| | | | |
|---|---|---|---|
| 2007/0104089 A1 | 5/2007 | Mujtaba | |
| 2011/0305178 A1* | 12/2011 | Zheng | H04B 7/0671 370/311 |
| 2012/0008643 A1* | 1/2012 | Zhang | H04B 7/0671 370/474 |
| 2015/0295629 A1* | 10/2015 | Xia | H04B 7/0491 370/329 |
| 2016/0242205 A1* | 8/2016 | Chen | H04L 27/2614 |

FOREIGN PATENT DOCUMENTS

| | | |
|---|---|---|
| EP | 2395678 A1 | 12/2011 |
| EP | 2479901 A2 | 7/2012 |

OTHER PUBLICATIONS

International Search Report and Written Opinion—PCT/US2015/053543—ISA/EPO—dated Dec. 23, 2015.

* cited by examiner

*Primary Examiner* — Sulaiman Nooristany
(74) *Attorney, Agent, or Firm* — Arent Fox, LLP and Qualcomm, Incorporated

(57) ABSTRACT

A method, an apparatus, and a computer-readable medium for wireless communication are provided. In one aspect, an apparatus includes a processor configured to determine a first set of CSD values for transmitting a first set of information on a plurality of antennas, determine a second set of CSD values for transmitting a second set of information on the plurality of antennas, and transmit the first set of information based on the first set of CSD values and the second set of information based on the second set of CSD values.

26 Claims, 7 Drawing Sheets

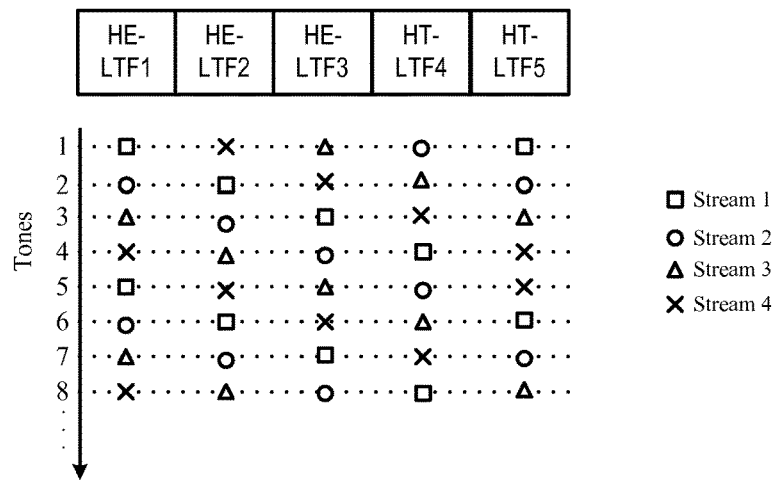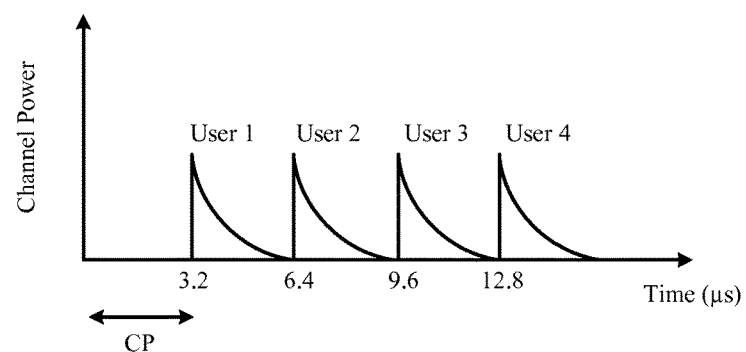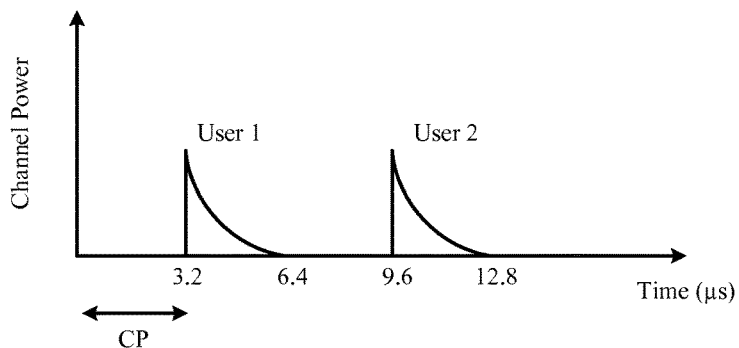
FIG. 3

PER STREAM AND PER ANTENNA CYCLIC SHIFT DELAY IN UPLINK MULTI-USER MIMO

CROSS-REFERENCE TO RELATED APPLICATION(S)

This application claims the benefit of U.S. Provisional Application Ser. No. 62/059,808, entitled "Per Stream and Per Anntena Cyclic Shift Delay in Uplink Multi-User MIMO" and filed on Oct. 3, 2014, which is expressly incorporated by reference herein in its entirety.

BACKGROUND

Field

The present disclosure relates generally to communication systems, and more particularly, to per stream and per antenna cyclic shift delay (CSD) in uplink multi-user (MU) multiple-input-multiple-output (MIMO) transmissions.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, Synchronous Optical Networking (SONET), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc., frequency bands. Wireless networks advantageously facilitate user mobility and rapid field deployment when compared to fixed wired networks.

SUMMARY

The systems, methods, computer-readable medium, and devices of the invention each have several aspects, no single one of which is solely responsible for the invention's desirable attributes. Without limiting the scope of this invention as expressed by the claims which follow, some features will now be discussed briefly. After considering this discussion, and particularly after reading the section entitled "Detailed Description," one will understand how the features of this invention provide advantages for devices in a wireless network.

One aspect of this disclosure provides an apparatus (e.g., a station) for wireless communication. The apparatus is configured to determine a first set of CSD values for transmitting a first set of information on a plurality of antennas. The apparatus is configured to determine a second set of CSD values for transmitting a second set of information on the plurality of antennas. The apparatus is configured to transmit the first set of information based on the first set of CSD values and transmit the second set of information based on the second set of CSD values.

BRIEF DESCRIPTION OF THE DRAWINGS

FIG. 3 illustrates diagrams of different LTF designs for uplink multi-user MIMO.

DETAILED DESCRIPTION

Figure 1:
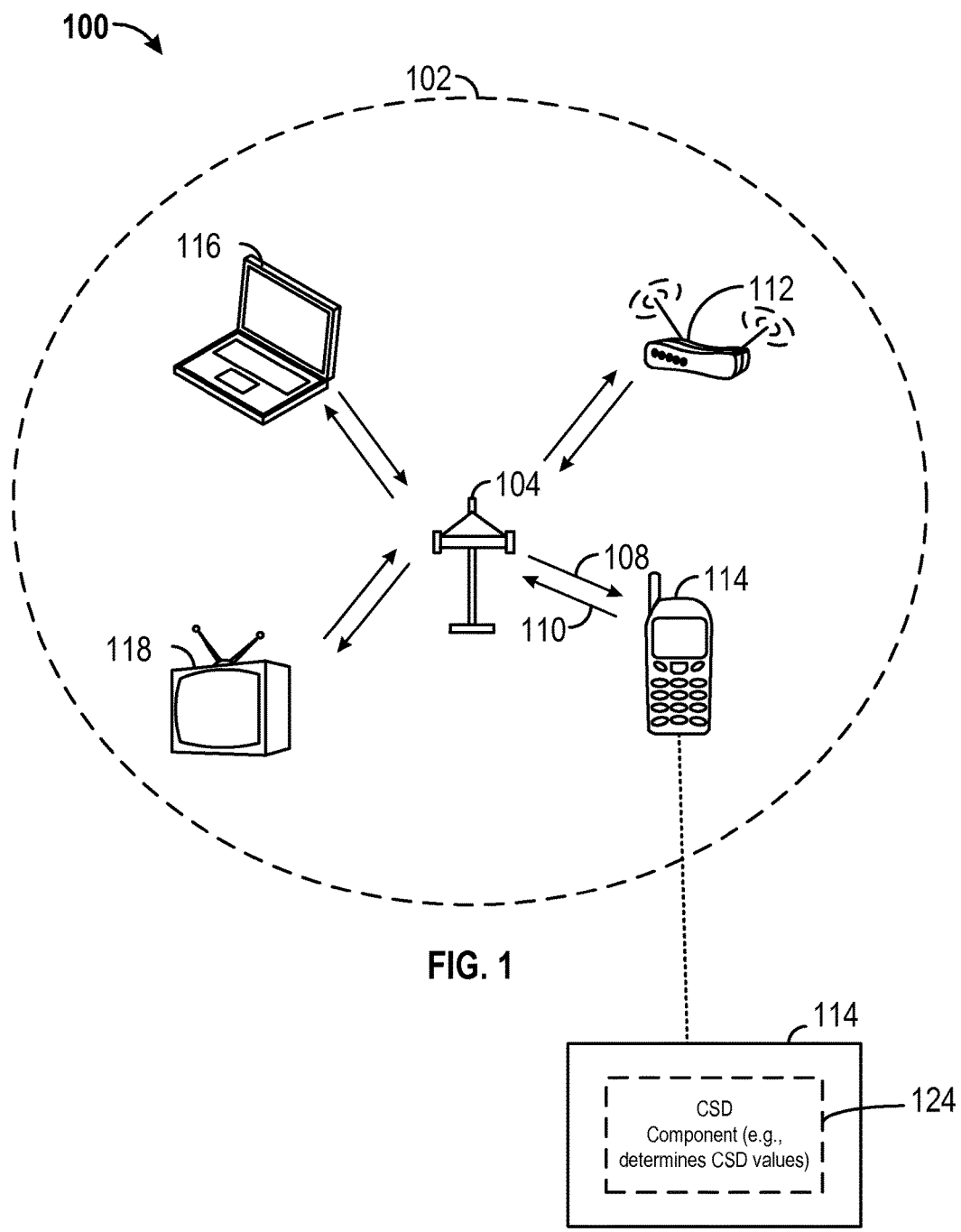
FIG. 1 shows an example wireless communication system in which aspects of the present disclosure may be employed.

Various aspects of the novel systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, computer program products, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of WLANs. A WLAN may be used to interconnect nearby devices together, employing widely used networking protocols. The various aspects described herein may apply to any communication standard, such as a wireless protocol.

In some aspects, wireless signals may be transmitted according to an 802.11 protocol using orthogonal frequency-division multiplexing (OFDM), direct-sequence spread spectrum (DSSS) communications, a combination of OFDM and DSSS communications, or other schemes. Implementations of the 802.11 protocol may be used for sensors, metering, and smart grid networks. Advantageously, aspects of certain devices implementing the 802.11 protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points (APs) and clients (also referred to as stations or "STAs"). In general, an AP may serve as a hub or base station for the WLAN and a STA serves as a user of the WLAN. For example, a STA may be a laptop computer, a personal digital assistant (PDA), a mobile phone, etc. In an example, a STA connects to an AP via a Wi-Fi (e.g., IEEE 802.11 protocol) compliant wireless link to obtain general connectivity to the Internet or to other wide area networks. In some implementations a STA may also be used as an AP.

An access point may also comprise, be implemented as, or known as a NodeB, Radio Network Controller (RNC), eNodeB, Base Station Controller (BSC), Base Transceiver Station (BTS), Base Station (BS), Transceiver Function (TF), Radio Router, Radio Transceiver, connection point, or some other terminology.

A station may also comprise, be implemented as, or known as an access terminal (AT), a subscriber station, a subscriber unit, a mobile station, a remote station, a remote terminal, a user terminal, a user agent, a user device, a user equipment, or some other terminology. In some implementations, a station may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

In an aspect, MIMO schemes may be used for wide area WLAN (e.g., Wi-Fi) connectivity. MIMO exploits a radio-wave characteristic called multipath. In multipath, transmitted data may bounce off objects (e.g., walls, doors, furniture), reaching the receiving antenna multiple times through different routes and at different times. A WLAN device that employs MIMO will split a data stream into multiple parts, called spatial streams (or multi-streams), and transmit each spatial stream through separate antennas to corresponding antennas on a receiving WLAN device.

The term "associate," or "association," or any variant thereof should be given the broadest meaning possible within the context of the present disclosure. By way of example, when a first apparatus associates with a second apparatus, it should be understood that the two apparatuses may be directly associated or intermediate apparatuses may be present. For purposes of brevity, the process for establishing an association between two apparatuses will be described using a handshake protocol that requires an "association request" by one of the apparatus followed by an "association response" by the other apparatus. It will be understood by those skilled in the art that the handshake protocol may require other signaling, such as by way of example, signaling to provide authentication.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element. In addition, a phrase referring to "at least one of" a list of items refers to any combination of those items, including single members. As an example, "at least one of: A, B, or C" is intended to cover: A, or B, or C, or any combination thereof (e.g., A-B, A-C, B-C, and A-B-C).

As discussed above, certain devices described herein may implement the 802.11 standard, for example. Such devices, whether used as a STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 shows an example wireless communication system 100 in which aspects of the present disclosure may be employed. The wireless communication system 100 may operate pursuant to a wireless standard, for example the IEEE 802.11 standard. The wireless communication system 100 may include an AP 104, which communicates with STAs (e.g., STAs 112, 114, 116, and 118).

A variety of processes and methods may be used for transmissions in the wireless communication system 100 between the AP 104 and the STAs. For example, signals may be sent and received between the AP 104 and the STAs in accordance with OFDM/OFDMA techniques. If this is the case, the wireless communication system 100 may be referred to as an OFDM/OFDMA system. Alternatively, signals may be sent and received between the AP 104 and the STAs in accordance with CDMA techniques. If this is the case, the wireless communication system 100 may be referred to as a CDMA system.

A communication link that facilitates transmission from the AP 104 to one or more of the STAs may be referred to as a downlink (DL) 108, and a communication link that facilitates transmission from one or more of the STAs to the AP 104 may be referred to as an uplink (UL) 110. Alternatively, a downlink 108 may be referred to as a forward link or a forward channel, and an uplink 110 may be referred to as a reverse link or a reverse channel. In some aspects, DL communications may include unicast or multicast traffic indications.

The AP 104 may suppress adjacent channel interference (ACI) in some aspects so that the AP 104 may receive UL communications on more than one channel simultaneously without causing significant analog-to-digital conversion (ADC) clipping noise. The AP 104 may improve suppression of ACI, for example, by having separate finite impulse response (FIR) filters for each channel or having a longer ADC backoff period with increased bit widths.

The AP 104 may act as a base station and provide wireless communication coverage in a basic service area (BSA) 102. A BSA (e.g., the BSA 102) is the coverage area of an AP (e.g., the AP 104). The AP 104 along with the STAs associated with the AP 104 and that use the AP 104 for communication may be referred to as a basic service set (BSS). It should be noted that the wireless communication system 100 may not have a central AP (e.g., AP 104), but rather may function as a peer-to-peer network between the STAs. Accordingly, the functions of the AP 104 described herein may alternatively be performed by one or more of the STAs.

The AP 104 may transmit on one or more channels (e.g., multiple narrowband channels, each channel including a frequency bandwidth) a beacon signal (or simply a "beacon"), via a communication link such as the downlink 108, to other nodes (STAs) of the wireless communication system 100, which may help the other nodes (STAs) to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information that is both common (e.g., shared) amongst several devices and specific to a given device.

In some aspects, a STA (e.g., STA 114) may be required to associate with the AP 104 in order to send communications to and/or to receive communications from the AP 104. In one aspect, information for associating is included in a beacon broadcast by the AP 104. To receive such a beacon, the STA 114 may, for example, perform a broad coverage search over a coverage region. A search may also be performed by the STA 114 by sweeping a coverage region in a lighthouse fashion, for example. After receiving the information for associating, the STA 114 may transmit a reference signal, such as an association probe or request, to the AP 104. In some aspects, the AP 104 may use backhaul services, for example, to communicate with a larger network, such as the Internet or a public switched telephone network (PSTN).

In an aspect, the STA 114 may include one or more components for performing various functions. For example, the STA 114 may include a CSD component 124 configured to determine a first set of CSD values for transmitting a first set of information on a set of antennas associated with the STA 114. The CSD component 124 may be configured to determine a second set of CSD values for transmitting a second set of information on the set of antennas. The CSD component 124 may be configured to transmit the first set of information based on the first set of CSD values and the second set of information based on the second set of CSD values.

Figure 2:
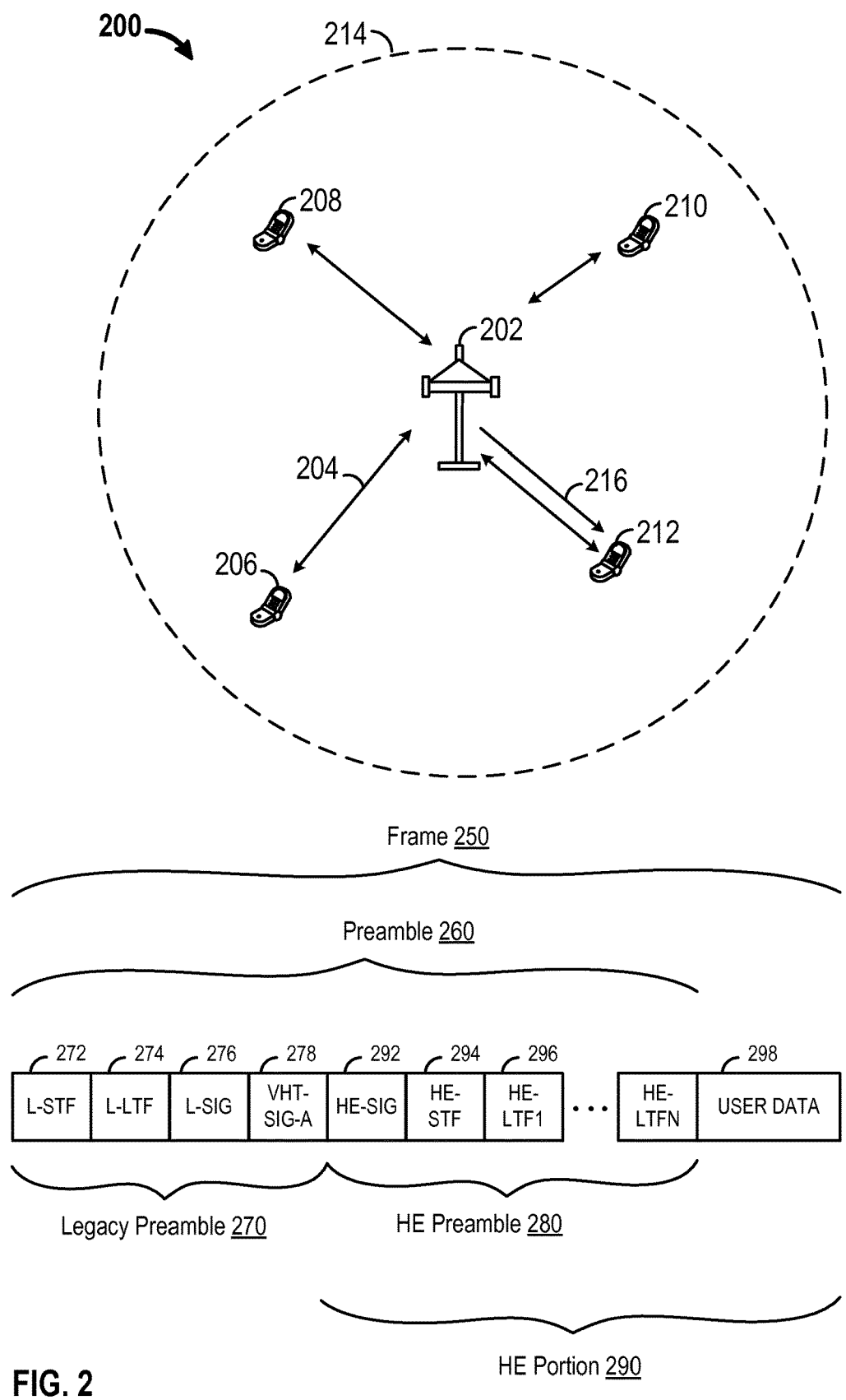
FIG. 2 is a diagram of a wireless network (e.g., a Wi-Fi network).

FIG. 2 is a diagram 200 of a wireless network (e.g., a Wi-Fi network employing the IEEE 802.11 standard). The diagram 200 illustrates an AP 202 broadcasting/transmitting within a service area 214. STAs 206, 208, 210, 212 are within the service area 214 of the AP 202 (although only four STAs are shown in FIG. 2, more or less STAs may be within the service area 214). The AP 202 may transmit a trigger message 216 to the STA 212 (and to the STAs 206, 208, 210). The trigger message 216 may include configuration information related to each of the STAs 206, 208, 210, 212.

The AP 202 may transmit symbols (e.g., data symbols or long training field (LTF) symbols) 204 to one or more STAs (e.g., STAs 206, 208, 210, 212) in one or more frames, and vice versa. A frame 250 may include a preamble 260 and data symbols 298. The preamble 260 may be considered a header of the frame 250 with information identifying a modulation and coding scheme, a transmission rate, and a length of time to transmit the frame 250, among other information. For example, the preamble 260 may include a legacy preamble 270 and a high-efficiency (HE) preamble 280 (e.g., the HE preamble 280 may be used in future IEEE 802.11 standards). The legacy preamble 270 may contain header information for older Wi-Fi standards to enable products incompatible with newer Wi-Fi standards to decode the frame 250. The legacy preamble 270 may include a legacy short training field (L-STF) symbol 272, a legacy long training field (L-LTF) symbol 274, a legacy signal field (L-SIG) symbol 276, a very high throughput signal field A (VHT-SIG-A) symbol 278, and/or other fields. Each of the various fields in the legacy preamble 270 may include one or more OFDM symbols and may have a 1× symbol time duration (e.g., symbol duration of 3.2 μs or some multiple of 3.2 μs). The L-STF symbol 272 may be used to improve automatic gain control (AGC) in a multi-transmit and multi-receive system. The L-LTF symbol 274 may be used to provide the information needed for a receiver (e.g., the STA 206 or the AP 202) to perform channel estimation. The L-SIG symbol 276 and the VHT-SIG-A symbol 278 may be used to provide transfer rate and length information. The symbols in the legacy preamble 270 may have a 1× symbol time duration (e.g., 4 μs of which 0.8 μs may be the cyclic prefix (CP))

In addition to the legacy preamble 270, the preamble 260 may include an HE preamble 280. The HE preamble 280 may contain header information related to a future Wi-Fi standard. The HE preamble 280 may include an HE signal field (HE-SIG) symbol 292, an HE short training field (HE-STF) symbol 294, one or more HE long training field (HE-LTF) symbols 296, and/or other fields. The HE-STF symbols 294 may be used to improve AGC. The HE-SIG symbol 292 may be used to provide transfer rate and length information. And the HE-LTF symbols 296 may be used for channel estimation. The number of HE-LTF symbols 296 may be equal to or greater than the number of space-time streams from different STAs. For example, if there are 4 STAs, there may be 4 LTF symbols (i.e. HE-LTF1, HE-LTF2, HE-LTF3, HE-LTF4). The frame 250 may also include a set of data symbols 298 that contain the user data to be communicated between the STA 206, for example, and the AP 202. The HE preamble 280 together with the data symbols 298 may make up an HE portion 290. The symbols in the HE preamble 280 and the data symbols 298 may have a 4× symbol time duration (e.g., 16 μs of which 3.2 μs may be the CP).

In uplink multi-user MIMO transmissions within a Wi-Fi network, such as the Wi-Fi network in FIG. 2, each STA may have multiple transmission antennas for MIMO. For example, the STA 206 may have 4 transmission antennas, the STA 208 may have 2 transmission antennas, and the STAs 210, 212 may each have 4 transmission antennas. If the STAs 206, 208, 210, 212 simultaneously transmit to the AP 202, each STA may not know how many transmission antennas from the other STAs will be participating in an uplink transmission. Unless the timing of the various transmissions is offset from each other, unintentional beamforming may result. As such, a need exists to determine how to apply a per antenna and/or per stream CSD for each STA (and to each antenna within each respective STA) to avoid unintentional beamforming, to ease the AGC settings, and to provide diversity for users/STAs especially in a flat fading scenario.

FIG. 3 illustrates diagrams 300, 330, 360 of different LTF designs for uplink multi-user MIMO. Diagram 300 illustrates 5 tone interleaved LTFs (e.g., HE-LTF). Each LTF symbol has a set of tones. In diagram 300, there are 4 streams, each denoted by a respective indicator (e.g., square, circle, triangle, x). Every stream visits (or is transmitted on) every tone by the end of the LTFs, which enables per-LTF phase tracking. In another design, a p-matrix-based LTF may be used with a 4× symbol duration. Diagram 330 illustrates a delay-based LTF (e.g., HE-LTF) with a 4× symbol duration. As shown in diagram 330, assuming there are 4 users, each having 1 stream, the stream for each respective user is offset by [0, 3.2, 6.4, 9.6] µs delays in an OFDM symbol which may have a 16 µs symbol duration with a 3.2 µs CP. In yet another design, diagram 360 illustrates a delay-based LTF (e.g., HE-LTF) with a 4× symbol duration. As shown in diagram 360, assuming there are 2 users, each having 1 stream, the stream for each respective user is offset by [0, 6.4] µs delays in an OFDM symbol which has a 16 µs symbol duration with a 3.2 µs CP.

Figure 4:
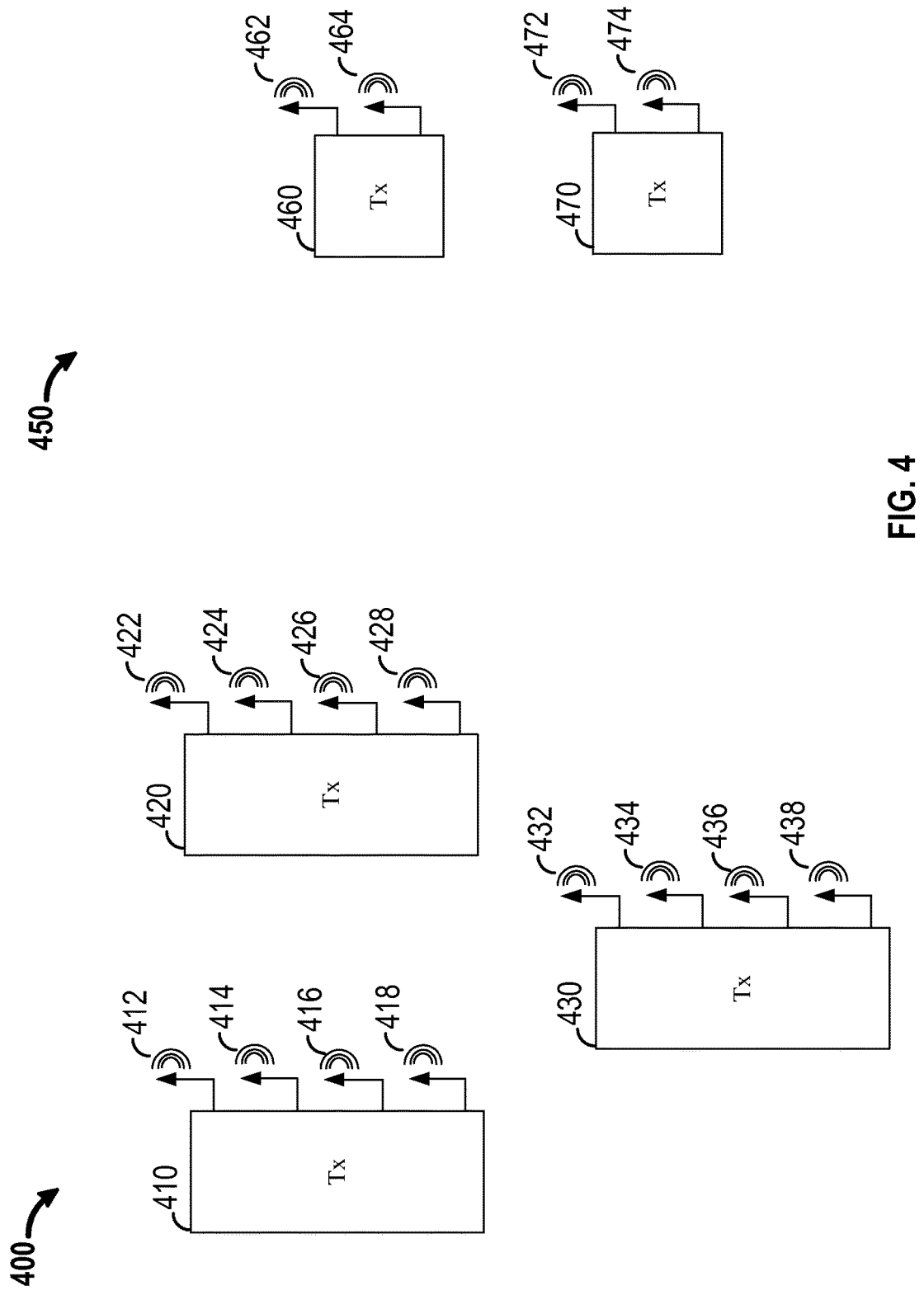
FIG. 4 illustrates diagrams of stations determining per antenna and/or per stream CSD values for transmitting information.

FIG. 4 illustrates diagrams 400, 450 of stations determining per antenna and/or per stream CSD values for transmitting information (e.g., the legacy preamble 270 and the HE portion 290). Diagram 400 illustrates 3 STAs 410, 420, 430 (which may correspond to STAs 208, 210, 212) associated with/served by an AP (e.g., the AP 202). Each of the STAs 410, 420, 430 may have 4 antennas. For example, the STA 410 may have antennas 412, 414, 416, 418. The STA 420 may have antennas 422, 424, 426, 428. The STA 430 may have antennas 432, 434, 436, 438. Similarly, diagram 450 illustrates 2 STAs 460, 470 (which may correspond to STAs 210, 212) associated with an AP (e.g., the AP 202). Each of the STAs 460, 470 has 2 antennas. For example, the STA 460 has antennas 462, 464. The STA 470 has antennas 472, 474. Referring to diagram 400, during uplink transmission, for example, the antennas for the STAs 410, 420, 430 may transmit information to an AP (e.g., the AP 202), and the information may include the legacy preamble 270, the HE preamble 280, and the data symbols 298. As previously discussed, however, the STA 410, for example, may not know how many transmission antennas from the STAs 420, 430 will be participating in uplink transmissions. To avoid unintentional beamforming, among other issues previously mentioned, CSD may be used for transmitting the legacy preamble 270, the HE preamble 280, and/or the data symbols 298.

Different CSD options may apply with respect to the legacy preambles compared to the HE preambles and the data symbols because cyclic shifts for legacy preambles are limited to 200 ns. As such, the discussion below presents CSD options for legacy preambles and CSD options for non-legacy preambles and data symbols.

CSD Options for Legacy Preambles

With respect to legacy preambles, two per antenna CSD options may be used.

Per Antenna CSD Option 1

In per antenna CSD option 1, uplink transmissions may be offset by assigning each STA a user CSD offset. Referring to diagram 400, each of the 4 antennas for the STAs 410, 420, 430 may have information to transmit to an AP (e.g., the AP 202), and the information may include the legacy preamble 270, for example. The STAs 410, 420, 430 may have an initial set of per antenna CSD values, which may be pre-configured within each of the STAs based on the antenna configuration (e.g., based a number of antennas). For example, the STA 410 may apply an initial set of CSD values [0 −50 −100 −150] ns to each of the 4 antennas 412, 414, 416, 418, respectively. Each of the other STAs 420, 430 may use the same initial set of CSD values [0 −50 −100 −150] ns for each of the 4 respective antennas. To avoid having the same delay from different users, a different CSD offset for each STA may be applied. In one configuration, the STAs 410, 420, 430 may receive user CSD offsets of 0 ns, −25 ns, and −50 ns, respectively via a trigger message (e.g., the trigger message 216). The STA 410 may modify the initial set of CSD values [0 −50 −100 −150] ns based on the user CSD offset. In an aspect, the STA 410 may modify the initial set of CSD values [0 −50 −100 −150] for the antennas 412, 414, 416, 418 based on a 0 ns user CSD offset and have the same set of CSD values. The STA 420 may modify the initial set of CSD values based on a −25 ns user CSD offset and have a set of CSD values [−25 −75 −125 −175] ns for the antennas 422, 424, 426, 428. The STA 430 modify the initial set of CSD values based on a −50 ns user CSD offset and have a set of CSD values [−50 −100 −150 −200] ns for the antennas 432, 434, 436, 438. In an aspect, the initial set of CSD values [0 −50 −100 −150] may be preconfigured into each of the STAs 410, 420, 430 based on the antenna configuration. In one aspect, the user CSD offset may be determined by the STAs 410, 420, 430 based on a user index which may be indicated in scheduling signaling from the AP 202. For example, when the AP 202 transmits a user index of 0 in scheduling signaling to the STA 410, the user index of 0 may correspond to a user CSD value of 0 ns. A user index of 1 may correspond to a user CSD value of −25 ns, etc. In an aspect, the STA 410 may have a table that indicates which user index corresponds to which CSD value, and the STA 410 may determine which CSD value to use upon receiving a user index based on the table. In another aspect, the user CSD value may be transmitted in a trigger message 216 from the AP 202. By adding time diversity to the CSD delay based on a per user CSD offset, the likelihood of unintentional beamforming for the uplink transmissions may be reduced. Although this example shows 4 antennas, more or less antennas may be used, and a different initial set of CSD values may also be used.

In an aspect, the per user CSD offset/value for each of the STAs 410, 420, 430 may be zero. In this aspect, each of the STAs 410, 420, 430 may apply the same per antenna CSD (e.g., [0 −50 −100 −150] ns if the number of transmission antennas is 4 for all STAs). Because different users may transmit using different transmission powers, in some instances, having the same delays among users may not cause beamforming (or excessive beamforming), especially when a service area has more than two users. With a greater number of STAs/users, there may be linear shifts due to the different inter-arrival times of transmissions among different STAs, which may offset the STA/user transmissions so that the probability of an unintentional beamforming may be reduced.

Per Antenna CSD Option 2

In per antenna CSD option 2, uplink transmissions may be offset by assigning/allocating one or more CSD values to each of the STAs according to the number of space-time streams each STA has been allocated. For example, referring to diagram 450 in FIG. 4, assume that the STAs 460, 470 are being served by the AP 202 and that the AP 202 has 4 antennas that support the STAs 460, 470. Each of the STAs 460, 470 has 2 antennas. In this example, the STA 460 may be assigned 2 streams for transmitting the legacy preamble 270 associated with the STA 460, and the STA 470 may be assigned 1 stream for transmitting the legacy preamble 270 associated with the STA 470. The STA 460 may be assigned two CSD values from the initial set of CSD values, which may be 0 ns and −50 ns. The STA 460 may apply these CSD values on the antennas 462, 464, respectively. The STA 470, which may have 1 space-time stream ($N_{sts}=1$) corresponding to the third stream of the multi-user MIMO streams, may be assigned the third CSD value from the initial set of CSD values, which may be −100 ns. Because the STA 470 has two antennas 472, 474, the STA 470 may map the −100 ns CSD value to the two antennas 472, 474 via a spatial mapping matrix [1;1], which corresponds to −100 ns for both the antennas 472, 474 for the STA 470. In this aspect, antennas may have the same CSD value when the number of spatial streams is less than a number of antennas for a given STA/user. Further, in this option, the assigned/allocated CSD value may be determined in part by the order in which each STA is allocated CSD values. For example, if the STA 460 is assigned CSD values first and the STA 470 is assigned CSD values second, then the STA 460 may be assigned CSD values of 0 ns and −50 ns, and the STA 470 may be assigned the CSD value −100 ns. By contrast, if the STA 470 is assigned CSD values first and the STA 460 is assigned CSD values second, then the STA 470 may be assigned the CSD value 0 ns and the STA 460 may be assigned the CSD values of −50 ns and −100 ns. In this option, each of the STAs 460, 470 may derive the assigned CSD value from a received spatial stream allocation information from the AP 202. The received spatial stream allocation information may be received in a trigger message 216 or in another message/packet from the AP 202, for example. Although this example uses an AP with 4 antennas and STAs with 2 antennas, other configurations may be used.

CSD Options for Non-Legacy Information

For non-legacy information (e.g., the HE preamble 280 and the data symbols 298) per antenna and per stream CSD options are available.

Per Stream CSD

Non-legacy information, which may include the HE preamble 280 and the data symbols 298, may be transmitted in spatial streams with a per stream CSD. For example, referring diagram 450 of FIG. 4, the STA 460 may determine/identify two spatial streams—stream A and stream B—for transmitting the HE preamble 280. The STA 460 may determine a per stream CSD value for each of stream A and stream B. For example, stream A may be given a 0 ns CSD value and stream B may be given a −400 ns CSD value. Accordingly, stream A may be transmitted at time 0 and stream B may transmitted with a 400 ns cyclic delay compared to stream A. Per stream CSD may be used with respect to HE-LTFs, for example, such as P-matrix based LTFs and those discussed with respect to diagrams 300, 330, and 360. However, for the delay based LTF in diagram 330, which uses a delay (equal to a multiple of the CP length) to separate users, further applying a per stream CSD could make different user channels collide with each other unless the users are separated by a delay of at least two times (2×) CP length. As such, for a symbol with a 4× symbol duration, an LTF design as shown in diagram 360 may be preferable to the LTF design as shown in diagram 330.

In addition to per stream CSD, per antenna CSD may be applied to the symbols in the HE preamble 280 and the data symbols 298.

Per Antenna CSD Option 1

In per antenna CSD option 1, uplink transmissions may be offset by assigning each STA a user CSD offset. Referring to diagram 400, each of the 4 antennas for the STAs 410, 420, 430 may have information to transmit to an AP, and the information may include the HE preamble 280 and/or the data symbols 298, for example. The STAs 410, 420, 430 may have an initial set of per antenna CSD values, which may be preconfigured within each of the STAs based on the antenna configuration (e.g., based a number of antennas). For example, the STA 410 may apply an initial set of CSD values [0 −400 −200 −600] ns to each of the 4 antennas 412, 414, 416, 418, respectively. Each of the other STAs 420, 430 may use the same initial set of CSD values [0 −400 −200 −600] ns for each of the 4 respective antennas. To avoid having the same delay from different antennas, a different CSD offset for each STA may be applied. In one configuration, the STAs 410, 420, 430 may receiver user CSD offsets of 0 ns, −50 ns, and −100 ns, respectively via a trigger message (e.g., the trigger message 216). The STA 410 may modify the initial set of CSD values [0 −400 −200 −600] ns based on the user CSD offset. In an aspect, the STA 410 may modify the initial set of CSD values [0 −400 −200 −600] for the antennas 412, 414, 416, 418 based on a 0 ns user CSD offset and have the same set of CSD values. The STA 420 may modify the initial set of CSD values based on a −50 ns user CSD offset and have a set of CSD values [−50 −450 −250 −650] ns for the antennas 422, 424, 426, 428. The STA 430 modify the initial set of CSD values based on a −100 ns user CSD offset and have a set of CSD values [−100 −500 −300 −700] ns for the antennas 432, 434, 436, 438. In an aspect, the initial set of CSD values [0 −400 −200 −600] may be preconfigured into each of the STAs 410, 420, 430 based on the antenna configuration. In one aspect, the user CSD offset may be determined by the STAs 410, 420, 430 based on a user index which may be indicated in scheduling signaling from the AP 202. For example, when the AP 202 transmits a user index of 0 in scheduling signaling to the STA 410, the user index of 0 may correspond to a user CSD value of 0. A user index of 1 may correspond to a user CSD value of −50 ns, etc. In another aspect, the user CSD value may be transmitted in a trigger message 216 from the AP 202. By adding time diversity to the CSD delay based on a per user CSD offset, the likelihood of unintentional beamforming for the uplink transmissions may be reduced. Although this example shows 4 antennas, more or less antennas may be used, and a different initial set of CSD values may also be used.

In an aspect, the per user CSD offset/value for each of the STAs 410, 420, 430 may be zero. In this aspect, each of the STAs 410, 420, 430 may apply the same per antenna CSD (e.g., [0 −400 −200 −600] ns if the number of transmission antennas is 4 for all STAs). Because different users may transmit using different transmission powers, in some instances, having the same delays among users may not cause beamforming (or excessive beamforming), especially when a service area has more than two users. With a greater number of STAs/users, there may be linear shifts due to the different inter-arrival times of transmissions among different STAs, which may offset the STA/user transmissions so that the probability of an unintentional beamforming may be reduced.

Per Antenna CSD Option 2

In per antenna CSD option 2, uplink transmissions may be offset by assigning/allocating one or more CSD values to each of the STAs according to the number of space-time streams each STA has been allocated. For example, referring to diagram 450 in FIG. 4, assume that the STAs 460, 470 are being served by the AP 202 and that the AP 202 has 4 antennas that support the STAs 460, 470. Each of the STAs 460, 470 has 2 antennas. In this example, the STA 460 may be assigned 2 streams for transmitting the HE preamble 280 and/or the data symbols 298, and the STA 470 may be assigned 1 stream for transmitting the HE preamble 280 and/or the data symbols 298. The STA 460 may be assigned two CSD values from the initial set of CSD values, which may be 0 ns and −400 ns. The STA 460 may apply these CSD values on the antennas 462, 464, respectively. The STA 470, which may have 1 space-time stream ($N_{sts}$=1) corresponding to the third stream of the multi-user MIMO streams, may be assigned the third CSD value from the initial set of CSD values, which may be −200 ns. Because the STA 470 has two antennas 472, 474, the STA 470 may map the −200 ns CSD value to the two antennas 472, 474 via a spatial mapping matrix [1;1], which corresponds to −200 ns for both the antennas 472, 474 for the STA 470. In this aspect, antennas may have the same CSD value when the number of spatial streams is less than a number of antennas for a given STA/user. Further, in this option, the assigned/allocated CSD value may be determined in part by the order in which each STA is allocated CSD values. In this option, each of the STAs 460, 470 may derive the assigned CSD value from a received spatial stream allocation information from the AP 202. The received spatial stream allocation information may be received in a trigger message 216 or in another message/packet from the AP 202, for example. Although this example uses an AP with 4 antennas and STAs with 2 antennas, other configurations may be used.

In as aspect, non-legacy information may be transmitted in symbols with a 4× symbol duration (e.g., 16 μs), while legacy information may be transmitted in symbols with a 1× symbol duration (e.g., 4 μs). As such, the per stream CSD values or per antenna CSD values for the non-legacy information with a 4× symbol duration may be 4 times greater than the CSD values for the non-legacy information with a 1× symbol duration. For example, a CSD value for the non-legacy information with a 4× duration may be 1.6 μs and a CSD value for the non-legacy information with a 1× duration may be 0.4 μs. The criteria for determining the CSD value may depend on what CSD value minimizes quantization and saturation at the ADC and what CSD value minimizes the difference between the measured STF and the data power. For each multi-stream transmission case, a CSD combination that works best across the additional white Gaussian noise (e.g., flat fading with random phase), channel model D non-line-of-sight (D-NLOS), and urban micro (UMi) NLOS may be preferred.

Figure 5:
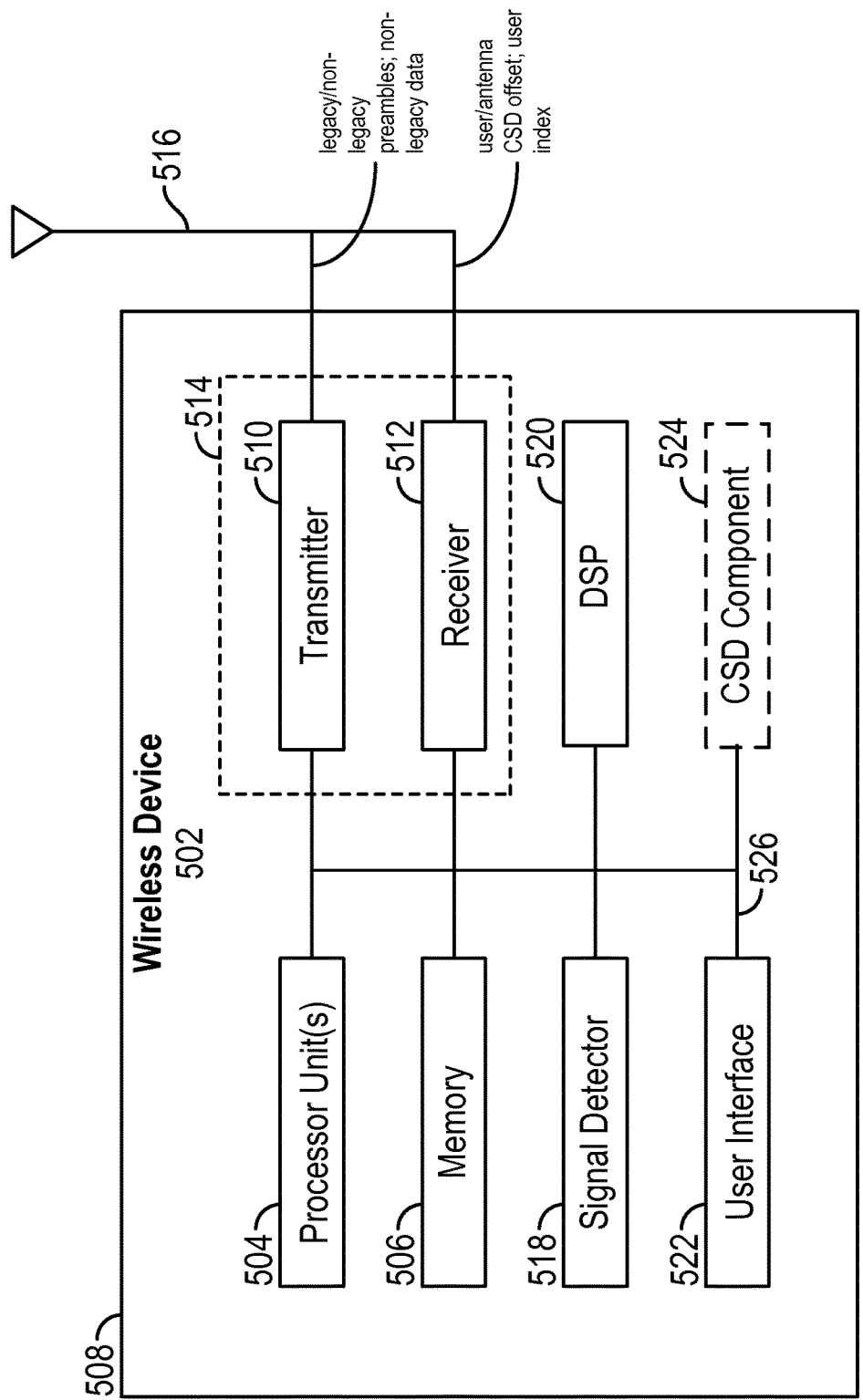
FIG. 5 is a functional block diagram of a wireless device that may be employed within the wireless communication system of FIG. 1 for transmitting information using per antenna and/or per stream CSD values.

FIG. 5 is a functional block diagram of a wireless device 502 that may be employed within the wireless communication system 100 of FIG. 1 for transmitting information using per antenna and/or per stream CSD values. The wireless device 502 is an example of a device that may be configured to implement the various methods described herein. For example, the wireless device 502 may be the STAs 112, 114, 116, 118.

The wireless device 502 may include a processor 504 which controls operation of the wireless device 502. The processor 504 may also be referred to as a central processing unit (CPU). Memory 506, which may include both read-only memory (ROM) and random access memory (RAM), may provide instructions and data to the processor 504. A portion of the memory 506 may also include non-volatile random access memory (NVRAM). The processor 504 typically performs logical and arithmetic operations based on program instructions stored within the memory 506. The instructions in the memory 506 may be executable (by the processor 504, for example) to implement the methods described herein.

The processor 504 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 502 may also include a housing 508, and the wireless device 502 may include a transmitter 510 and/or a receiver 512 to allow transmission and reception of data between the wireless device 502 and a remote device. The transmitter 510 and the receiver 512 may be combined into a transceiver 514. An antenna 516 may be attached to the housing 508 and electrically coupled to the transceiver 514. The wireless device 502 may also include multiple transmitters, multiple receivers, multiple transceivers, and/or multiple antennas.

The wireless device 502 may also include a signal detector 518 that may be used to detect and quantify the level of signals received by the transceiver 514 or the receiver 512. The signal detector 518 may detect such signals as total energy, energy per subcarrier per symbol, power spectral density, and other signals. The wireless device 502 may also include a digital signal processor (DSP) 520 for use in processing signals. The DSP 520 may be configured to generate a packet for transmission. In some aspects, the packet may comprise a physical layer convergence procedure (PLCP) protocol data unit (PPDU).

The wireless device 502 may further comprise a user interface 522 in some aspects. The user interface 522 may comprise a keypad, a microphone, a speaker, and/or a display. The user interface 522 may include any element or component that conveys information to a user of the wireless device 502 and/or receives input from the user.

When the wireless device 502 is implemented as a STA (e.g., the STA 114, the STA 206), the wireless device 502 may also comprise a CSD component 324. The CSD component 324 may be configured to determine a first set of CSD values for transmitting a first set of information on a plurality of antennas. The CSD component 324 may be configured to determine a second set of CSD values for transmitting a second set of information on the plurality of antennas. The CSD component 324 may be configured to transmit the first and second sets of information based on the first and second sets of CSD values. In one configuration, the CSD component 324 may determine the first set of CSD values by determining an antenna CSD value for each antenna of the plurality of antennas, by determining a user CSD offset, and by modifying the antenna CSD value for each antenna of the plurality of antennas based on the determined user CSD offset. In one configuration, the CSD component 324 may determine the first set of CSD values by determining at least one assigned CSD value and determining an antenna CSD value for each antenna of the plurality of antennas based on the determined at least one assigned antenna CSD value. In another configuration, the CSD component 324 may be further configured to determine a third set of CSD values for transmitting the second set of information on the plurality of antennas and transmit the second set of information based on the second and third sets of CSD values. In another configuration, the CSD component 324 may be configured to determine the third set of CSD values by determining an antenna CSD value for each antenna of the plurality of antennas, by determining a user CSD offset, and by modifying the antenna CSD value for each antenna of the plurality of antennas based on the determined user CSD offset. In another configuration, the CSD component 324 may be configured to determine at least one assigned CSD value and to determine an antenna CSD value for each antenna of the plurality of antennas based on the determined at least one assigned CSD value. In another configuration, the stream CSD value may be four times greater than a CSD value of a symbol with a 1× time duration. In another configuration, the antenna CSD value may be four times greater than a CSD value of a symbol with a 1× time duration.

The various components of the wireless device 502 may be coupled together by a bus system 526. The bus system 526 may include a data bus, for example, as well as a power bus, a control signal bus, and a status signal bus in addition to the data bus. Components of the wireless device 502 may be coupled together or accept or provide inputs to each other using some other mechanism.

Although a number of separate components are illustrated in FIG. 5, one or more of the components may be combined or commonly implemented. For example, the processor 504 may be used to implement not only the functionality described above with respect to the processor 504, but also to implement the functionality described above with respect to the signal detector 518, the DSP 520, the user interface 522, and/or the CSD component 524. Further, each of the components illustrated in FIG. 5 may be implemented using a plurality of separate elements.

Figure 6:
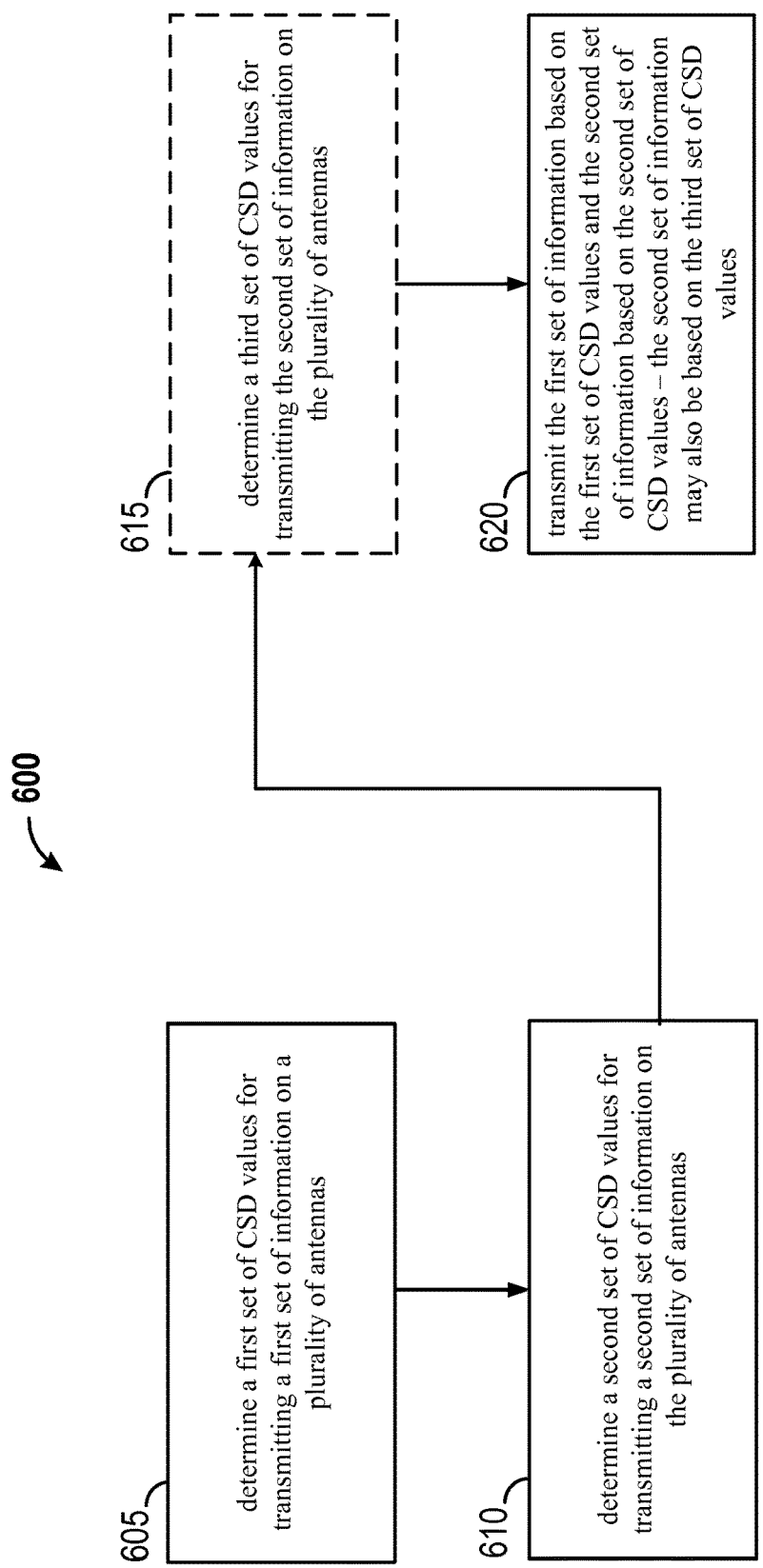
FIG. 6 is a flowchart of an exemplary method of wireless communication for transmitting information using per antenna and/or per stream CSD values.

FIG. 6 is a flowchart of an exemplary method 600 of wireless communication for transmitting information using per antenna and/or per stream CSD values. The method 600 may be performed using an apparatus (e.g., the STA 114, the STA 212, or the wireless device 302, for example). Although the method 600 is described below with respect to the elements of wireless device 502 of FIG. 5, other components may be used to implement one or more of the steps described herein. In FIG. 6, the blocks indicated with dotted lines represent optional operations.

At block 605, the apparatus may determine a first set of CSD values for transmitting a first set of information on a plurality of antennas. For example, referring to FIGS. 2 and 4, the apparatus may be the STA 410 and the first set of information may be the legacy preamble 270. In an aspect, the STA 410 may have the legacy preamble 270 for transmission. The STA 410 may receive a user CSD offset from the AP 202 in the trigger message 216. The STA 410 may determine an initial set of CSD values [0 −50 −100 −150] ns for each of the 4 antennas 412, 414, 416, 418. The initial set of CSD values may be pre-configured at the STA 410. Based on the trigger message 216, the STA 410 may determine a user CSD offset of −25 ns (e.g., based on a user index set to 1). The STA 410 may modify the initial set of CSD values to determine a set of antenna CSD values [−25 −75 −125 −175] ns. In another example, the apparatus may be the STA 460. The STA 460 may have the legacy preamble 270 (the first set of information) for transmission. In this example, the STA 460 may receive two assigned values [0 −50] ns and determine that the antenna 462 has a CSD value of 0 ns and the antenna 464 has a CSD value of −50 ns.

At block 610, the apparatus may determine a second set of CSD values for transmitting a second set of information on the plurality of antennas. For example, referring to FIGS. 2 and 4, the apparatus may be the STA 460 and the second set of information may be the HE preamble 280. In one example, the STA 460 may have the HE preamble 280 (e.g., HE-LTF symbols 296) for transmission. The HE preamble 280 may be transmitted in two streams—stream A and stream B. The STA 460 may apply a per stream CSD by identifying the number of streams for transmitting the HE preamble 280 (e.g., 2 streams) and by determining a per stream CSD value for each of the streams, stream A and B, respectively. Stream A may have a stream CSD value of 0 ns, and stream B may have a stream CSD value of −400 ns. In another example, the STA 460 may apply a per antenna CSD.

At block 615, the apparatus may determine a third set of CSD values for transmitting the second set of information on the plurality of antennas. For example, referring to FIGS. 2 and 4, the apparatus may be the STA 460 and the second set of information may be the HE preamble 280. In an aspect, the STA 460 may apply a per antenna CSD for transmitting the HE preamble 280. In this example, the STA 460 may receive a trigger message 216 from the AP 202, and the trigger message 216 may indicate a user CSD offset of −50 ns. Based on the trigger message 216, the STA 460 may determine a user CSD offset of −50 ns. The STA 410 may modify the set of CSD values, which may be [0 −400] ns based on block 610, to determine a set of antenna CSD values [−50 −450] ns for transmitting the HE preamble 280. In another aspect, the second set of CSD values may be a per antenna CSD and the third set of CSD values may be a per stream CSD.

At block 620, the apparatus may transmit the first set of information based on the first set of CSD values and the second set of information based on the second set of CSD values. In one configuration, the apparatus may transmit the second set of information based on the second and third sets of CSD values. For example, referring to FIGS. 2 and 4, the STA 460 may transmit the legacy preamble 270 based on a set of per antennas CSD values [0 −50] ns and transmit the HE preamble 280 based on CSD values [−50 −450] ns, determined based on a set of per stream CSD values [0 −400] ns and a per antenna CSD value of −50 ns for the STA 460.

Figure 7:
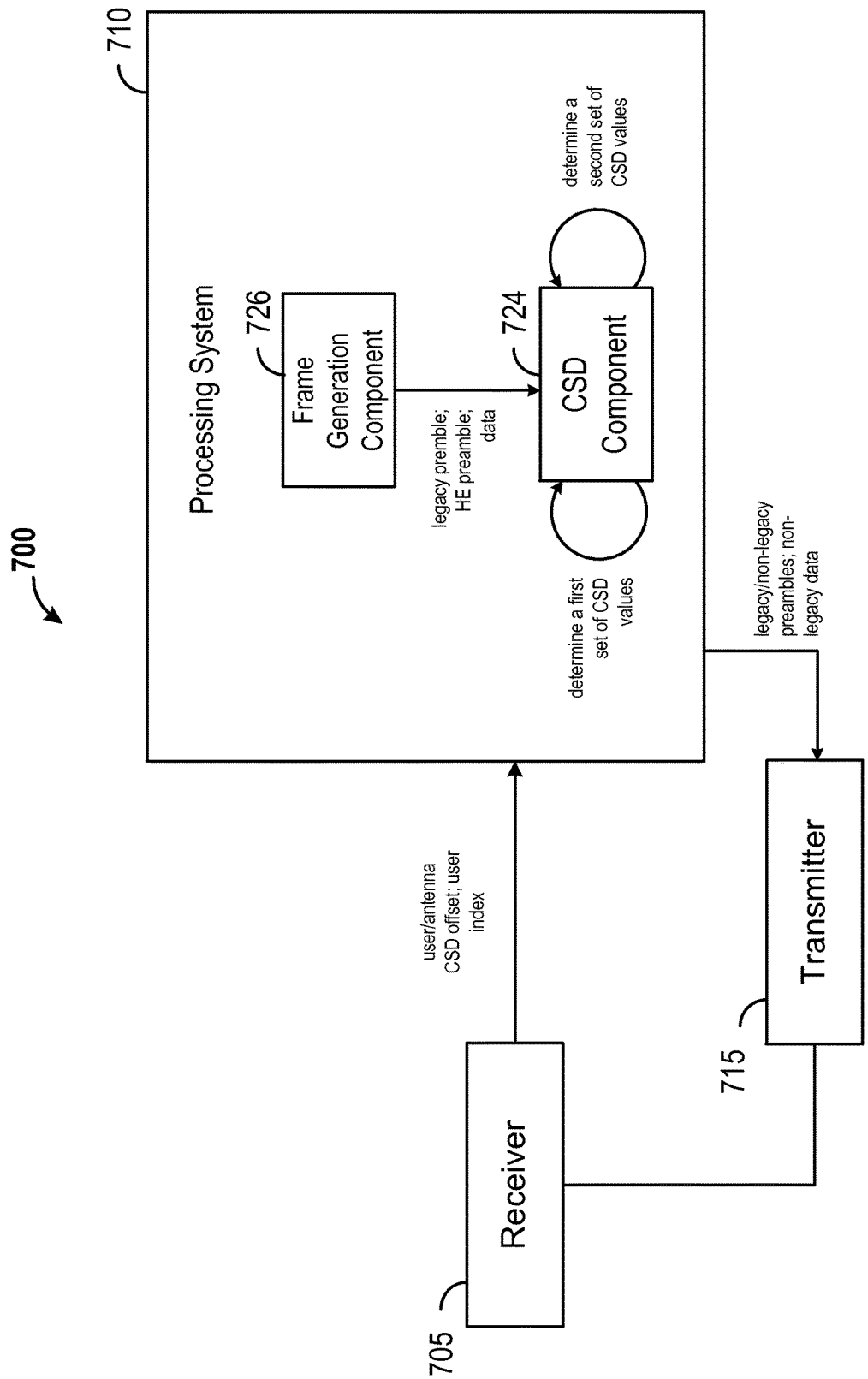
FIG. 7 is a functional block diagram of an exemplary wireless communication device for transmitting information using per antenna and/or per stream CSD values.

FIG. 7 is a functional block diagram of an exemplary wireless communication device 700 for transmitting information using per antenna and/or per stream CSD values. The wireless communication device 700 may include a receiver 705, a processing system 710, and a transmitter 715. The processing system 710 may include a CSD component 724 and/or a frame generation component 726. In an aspect, the frame generation component 726 may be configured to generate a frame to be transmitted. The frame generation component 726 may generate a legacy preamble, an HE preamble, and data associated with a frame to be transmitted. The frame generation component 726 may provide the frame to be transmitted to the CSD component 724. 1. The processing system 710 and/or the CSD component 724 may be configured to determine a first set of CSD values for transmitting a first set of information on a plurality of antennas. The processing system 710 and/or the CSD component 724 may be configured to determine a second set of CSD values for transmitting a second set of information on the plurality of antennas. The processing system 710, the CSD component 724, and/or the transmitter 715 may be configured to transmit the first set of information based on the first set of CSD values and the second set of information based on the second set of CSD values. In one configuration, the processing system 710 and/or the CSD component 724 may be configured to determine the first set of CSD values by determining an antenna CSD value for each antenna of the plurality of antennas, by determining a user CSD offset, and by modifying the antenna CSD value for each antenna of the plurality of antennas based on the determined user CSD offset. In another configuration, the processing system 710 and/or the CSD component 724 may be configured to determine the first set of CSD values by determining at least one assigned CSD value and by determining an antenna CSD value for each antenna of the plurality of antennas based on the determined at least one assigned antenna CSD value. In another configuration, the processing system 710 and/or the CSD component 724 may be configured to determine the second set of CSD values by identifying a plurality of streams for transmitting the second set of information and by determining a stream CSD value for each stream of the plurality of streams. In an aspect, the stream CSD value for a symbol with a 4× time duration may be four times greater than a CSD value of a non-legacy symbol with a 1× time duration. In another configuration, the processing system 710 and/or the CSD component 724 may be configured to determine a third set of CSD values for transmitting the second set of information on the plurality of antennas. In this configuration, the second set of information may be transmitted based on the second and third sets of CSD values. In another configuration, the processing system 710 and/or the CSD component 724 may be configured to determining the third set of CSD values by determining an antenna CSD value for each antenna of the plurality of antennas, by determining a user CSD offset, and by modifying the antenna CSD value for each antenna of the plurality of antennas based on the determined user CSD offset. In an aspect, the antenna CSD value for a symbol with a 4× time duration may be four times greater than a CSD value of a non-legacy symbol with a 1× time duration. In another configuration, the processing system 710 and/or the CSD component 724 may be configured to determine the third set of CSD values by determining at least one assigned CSD value and by determining an antenna CSD value for each antenna of the plurality of antennas based on the determined at least one assigned CSD value.

The receiver 705, the processing system 710, the CSD component 724, the frame generation component 726, and/or the transmitter 715 may be configured to perform one or more functions discussed above with respect to blocks 605, 610, 615, and 620 of FIG. 6. The receiver 705 may correspond to the receiver 512. The processing system 710 may correspond to the processor 504. The transmitter 715 may correspond to the transmitter 510. The CSD component 724 may correspond to the CSD component 124 and/or the CSD component 524.

In one configuration, the wireless communication device 700 may include means for determining a first set of CSD values for transmitting a first set of information on a plurality of antennas. The wireless communication device 700 may include means for determining a second set of CSD values for transmitting a second set of information on the plurality of antennas. The wireless communication device 700 may include means for transmitting the first set of information based on the first set of CSD values and the second set of information based on the second set of CSD values. In one configuration, the means for determining the first set of CSD values may be configured to determine an antenna CSD value for each antenna of the plurality of antennas, to determine a user CSD offset, and to modifying the antenna CSD value for each antenna of the plurality of antennas based on the determined user CSD offset. In another configuration, the means for determining the first set of CSD values may be configured to determine at least one assigned CSD value and to determine an antenna CSD value for each antenna of the plurality of antennas based on the determined at least one assigned antenna CSD value. In another configuration, the means for determining the second set of CSD values may be configured to identify a plurality of streams for transmitting the second set of information and to determine a stream CSD value for each stream of the plurality of streams. In another configuration, the wireless communication device 700 may include means for determining a third set of CSD values for transmitting the second set of information on the plurality of antennas. In this configuration, the second set of information may be transmitted based on the second and third sets of CSD values. In another configuration, the means for determining the third set of CSD values may be configured to determine an antenna CSD value for each antenna of the plurality of antennas, to determine a user CSD offset, and to modifying the antenna CSD value for each antenna of the plurality of antennas based on the determined user CSD offset. In another configuration, the means for determining the third set of CSD values may be configured to determine at least one assigned CSD value and to determine an antenna CSD value for each antenna of the plurality of antennas based on the determined at least one assigned CSD value. In an aspect, the stream CSD value for a symbol with a 4× time duration may be four times greater than a CSD value of a non-legacy symbol with a 1× time duration. In another aspect, the antenna CSD value for a symbol with a 4× time duration may be four times greater than a CSD value of a non-legacy symbol with a 1× time duration.

For example, means for determining a first set of CSD values may comprise the CSD component 724 and/or the processing system 710. The means for determining a second set of CSD values may comprise the CSD component 724 and/or the processing system 710. The means for transmitting the first set of information and the second set of information may comprise the CSD component 724, the processing system 710, and/or the transmitter 715. The means for determining a third set of CSD values may comprise the CSD component 724 and/or the processing system 710.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, components and circuits described in connection with the present disclosure may be implemented or performed with a general purpose processor, a DSP, an application specific integrated circuit (ASIC), an FPGA or other PLD, discrete gate or transistor logic, discrete hardware components or any combination thereof designed to perform the functions described herein.

A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, compact disk (CD)-ROM (CD-ROM) or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, digital versatile disc (DVD), floppy disk and Blu-ray disc where disks usually reproduce data magnetically, while discs reproduce data optically with lasers. Thus, computer readable medium comprises a non-transitory computer readable medium (e.g., tangible media).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Further, it should be appreciated that components and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. A method of wireless communication of a station, the method comprising:
    determining a first plurality of cyclic shift delay (CSD) values for transmitting a first preamble of a frame on a plurality of antennas, wherein determining the first plurality of CSD values comprises: determining a first antenna CSD value for each antenna of the plurality of antennas, determining a first user CSD offset, and modifying the first antenna CSD value for each antenna of the plurality of antennas based on the determined first user CSD offset;
    determining a second plurality of CSD values for transmitting a second preamble of the frame on the plurality of antennas, wherein the first plurality of CSD values is different from the second plurality of CSD values; and
    transmitting the first preamble of the frame based on the first plurality of CSD values and the second preamble of the frame based on the second plurality of CSD values.

2. The method of claim 1, wherein determining the first plurality of CSD values comprises:
    determining at least one assigned CSD value based on an assigned number of streams; and
    determining the first antenna CSD value for each antenna of the plurality of antennas based on the determined at least one assigned antenna CSD value.

3. The method of claim 1, wherein determining the second plurality of CSD values comprises:
    identifying a plurality of streams for transmitting the second preamble of the frame; and determining a stream CSD value for each stream of the plurality of streams.

4. The method of claim 3, wherein the stream CSD value for a symbol with a 4× time duration is four times greater than a CSD value of a non-legacy symbol with a 1× time duration.

5. The method of claim 1, further comprising:
determining a third plurality of CSD values for transmitting the second preamble of the frame on the plurality of antennas,
wherein transmitting the second preamble of the frame is based on the second plurality of CSD values and the third plurality of CSD values.

6. The method of claim 5, wherein the determining the third plurality of CSD values comprises:
determining a second antenna CSD value for each antenna of the plurality of antennas;
determining a second user CSD offset; and
modifying the second antenna CSD value for each antenna of the plurality of antennas based on the determined second user CSD offset.

7. The method of claim 6, wherein the second antenna CSD value for a symbol with a 4× time duration is four times greater than a CSD value of a non-legacy symbol with a 1× time duration.

8. The method of claim 5, wherein determining the third plurality of CSD values comprises:
determining at least one assigned CSD value; and
determining a second antenna CSD value for each antenna of the plurality of antennas based on the determined at least one assigned CSD value.

9. An apparatus for wireless communication, comprising:
means for determining a first plurality of cyclic shift delay (CSD) values for transmitting a first preamble of a frame on a plurality of antennas, wherein the means for determining the first plurality of CSD values is configured to: determine a first antenna CSD value for each antenna of the plurality of antennas, determine a first user CSD offset, and modify the first antenna CSD value for each antenna of the plurality of antennas based on the determined first user CSD offset;
means for determining a second plurality of CSD values for transmitting a second preamble of the frame on the plurality of antennas, wherein the first plurality of CSD values is different from the second plurality of CSD values; and
means for transmitting the first preamble of the frame based on the first plurality of CSD values and the second preamble of the frame based on the second plurality of CSD values.

10. The apparatus of claim 9, wherein the means for determining the first plurality of CSD values is configured to:
determine at least one assigned CSD value based on an assigned number of streams; and
determine the first antenna CSD value for each antenna of the plurality of antennas based on the determined at least one assigned antenna CSD value.

11. The apparatus of claim 9, wherein the means for determining the second plurality of CSD values is configured to:
identify a plurality of streams for transmitting the second preamble of the frame; and
determine a stream CSD value for each stream of the plurality of streams.

12. The apparatus of claim 11, wherein the stream CSD value for a symbol with a 4× time duration is four times greater than a CSD value of a non-legacy symbol with a 1× time duration.

13. The apparatus of claim 9, further comprising:
means for determining a third plurality of CSD values for transmitting the second preamble of the frame on the plurality of antennas,
wherein transmitting the second preamble of the frame is based on the second plurality of CSD values and the third plurality of CSD values.

14. The apparatus of claim 13, wherein the means for determining the third plurality of CSD values is configured to:
determine a second antenna CSD value for each antenna of the plurality of antennas;
determine a second user CSD offset; and
modify the second antenna CSD value for each antenna of the plurality of antennas based on the determined second user CSD offset.

15. The apparatus of claim 14, wherein the second antenna CSD value for a symbol with a 4× time duration is four times greater than a CSD value of a non-legacy symbol with a 1× time duration.

16. The apparatus of claim 13, wherein the means for determining the third plurality of CSD values is configured to:
determine at least one assigned CSD value; and
determine a second antenna CSD value for each antenna of the plurality of antennas based on the determined at least one assigned CSD value.

17. An apparatus for wireless communication, comprising:
a memory; and
at least one processor coupled to the memory, wherein the at least one processor is configured to:
determine a first plurality of cyclic shift delay (CSD) values for transmitting a first preamble of a frame on a plurality of antennas, wherein the at least one processor is configured to determine a first plurality of CSD values by being configured to: determine a first antenna CSD value for each antenna of the plurality of antennas, determine a first user CSD offset, and modify the first antenna CSD value for each antenna of the plurality of antennas based on the determined first user CSD offset;
determine a second plurality of CSD values for transmitting a second preamble of the frame on the plurality of antennas, wherein the first plurality of CSD values is different from the second plurality of CSD values; and
transmit the first preamble of the frame based on the first plurality of CSD values and the second preamble of the frame based on the second plurality of CSD values.

18. The apparatus of claim 17, wherein the at least one processor is configured to determine the first plurality of CSD values by being configured to:
determine at least one assigned CSD value based on an assigned number of streams; and
determine the first antenna CSD value for each antenna of the plurality of antennas based on the determined at least one assigned antenna CSD value.

19. The apparatus of claim 17, wherein the at least one processor is configured to determine the second plurality of CSD values by being configured to:

identify a plurality of streams for transmitting the second preamble of the frame; and determine a stream CSD value for each stream of the plurality of streams.

20. The apparatus of claim 19, wherein the stream CSD value for a symbol with a 4× time duration is four times greater than a CSD value of a non-legacy symbol with a 1× time duration.

21. The apparatus of claim 17, wherein the at least one processor is further configured to determine a third plurality of CSD values for transmitting the second preamble of the frame on the plurality of antennas, wherein the at least one processor is configured to transmit the second preamble of the frame based on the second and third sets of CSD values.

22. The apparatus of claim 21, wherein the at least one processor is configured to determine the third plurality of CSD values by being configured to:

determine a second antenna CSD value for each antenna of the plurality of antennas;

determine a second user CSD offset; and modify the second antenna CSD value for each antenna of the plurality of antennas based on the determined second user CSD offset.

23. The apparatus of claim 22, wherein the second antenna CSD value for a symbol with a 4× time duration is four times greater than a CSD value of a non-legacy symbol with a 1× time duration.

24. The apparatus of claim 21, wherein the at least one processor is configured to determine the third plurality of CSD values by being configured to:

determine at least one assigned CSD value; and determine a second antenna CSD value for each antenna of the plurality of antennas based on the determined at least one assigned CSD value.

25. A non-transitory computer-readable medium storing computer executable code for wireless communication by a wireless device, comprising code for:

determining a first plurality of cyclic shift delay (CSD) values for transmitting a first preamble of a frame on a plurality of antennas, wherein the code for determining the first plurality of CSD values comprises code for:
determining an antenna CSD value for each antenna of the plurality of antennas, determining a user CSD offset, and modifying the antenna CSD value for each antenna of the plurality of antennas based on the determined user CSD offset;

determining a second plurality of CSD values for transmitting a second preamble of the frame on the plurality of antennas, wherein the first plurality of CSD values is different from the second plurality of CSD values; and transmitting the first preamble of the frame based on the first plurality of CSD values and the second preamble of the frame based on the second plurality of CSD values.

26. The non-transitory computer-readable medium of claim 25, wherein the code for determining the first plurality of CSD values comprises code for:

determining at least one assigned CSD value based on an assigned number of streams; and determining the antenna CSD value for each antenna of the plurality of antennas based on the determined at least one assigned antenna CSD value.

* * * * *